Patented July 14, 1942

2,289,407

UNITED STATES PATENT OFFICE 2,289,407

CHEWING GUM

Clyde Hampton Boys, Drexel Hill, Pa., assignor to Hercules Powder Company, Wilmington, Del., a corporation of Delaware No Drawing. Application October 31, 1940,
Serial No. 363,673

10 Claims. (Cl. 99—135)

This invention relates to chewing gum material.

Chewing gum usually consists of a gum chicle base with various fillers, sweetening and flavoring ingredients. Because of the high cost of gum chicle and for other reasons, chicle substitutes such as blends of resinous material such as rosin with rubber or a rubber-like material, together with oily and waxy components if desired, are being used in place of part or all of the gum chicle in the base. Such substitutes have not been entirely satisfactory due to improper physical properties, instability, deterioration upon ageing, premature loss of flavor, and for other reasons. In many cases, these disadvantages are attributable to the resinous component employed. For example, rosin and ester gum may not impart sufficient hardness due to their low melting points, cause unduly rapid deterioration, show or develop a bitter flavor or acridity which are imparted to the gum, and make it difficult to formulate a gum or gum base having the desired physical properties.

It is an object of the present invention to provide an improved chewing gum overcoming to a large extent the disadvantages set forth above. Another object is to provide an improved chewing gum base adapted to be blended with the usual sweetening and flavoring components to yield an improved chewing gum. Still other objects will more fully hereinafter appear.

I have discovered that these objects may be accomplished by the use of a pentaerythritol ester of rosin, hydrogenated rosin, or polymerized rosin. By "rosin" is meant wood or gum rosin, or equivalents thereof such as heat treated rosin, isomerized rosin, commercial abietic acid, pimaric acid, sapinic acid, etc. Such pentaerythritol esters are more satisfactory resinous materials for incorporation in chewing gum than unesterified rosin, hydrogenated rosin, or polymerized rosin, and also more desirable than the straight glycerine esters. The greater hardness and higher melting point of the pentaerythritol esters offers a distinct advantage in formulating a gum having the desired physical characteristics. The pentaerythritol esters may be readily prepared with low acid numbers which is a further advantage since such low acid number resins do not impart a bitterness or a stinging, pungent, or biting flavor to the chewing gum, and produce firmer chewing gums. Pentaerythritol esters of rosin, and particularly of hydrogenated or polymerized rosin are stable to oxidation and deterioration which is very important in chewing gums.

Pentaerythritol esters of rosin having an acid number of from about 4 to about 35 and a melting point of from about 90° C. to about 150° C. are satisfactory for incorporation in chewing gum. Pentaerythritol esters of hydrogenated rosin and of polymerized rosin having in general about the same characteristics are satisfactory. In general, the lower the acid number the more satisfactory the pentaerythritol resinous ester for use in chewing gum. Pentaerythritol esters having an acid number not over about 35 and preferably not over about 15 are preferred. The pentaerythritol esters of hydrogenated rosin and of polymerized rosin in general display greater freedom from taste and tendency to deteriorate with the same acid number or degree of esterification, than the corresponding esters of rosin. The higher melting point of the pentaerylthritol esters of polymerized rosin is particularly advantageous.

I have further found that still better results may be obtained by the use of a mixed pentaerythritol-glycerine ester of rosin, hydrogenated rosin, or polymerized rosin. It is preferred to use such an ester wherein the pentaerythritol preponderates over the glycerine. A satisfactry proportion is 80% by weight of pentaerythritol and 20% by weight of glycerine. Such esters show a hardness and melting point somewhat lower than straight pentaerythritol esters, and it is possible to more readily obtain pentaerythritol-glycerine esters of lower acid number which is very desirable. For example, mixed pentaerythritol-glycerine esters of an acid number not over about 15 and even as low as not over about 10 or lower may be readily prepared.

The preparation of the pentaerythritol esters for use in carrying out the present invention may be effected in any manner known to the art. The manufacture of the straight pentaerythritol esters of rosin is described in U. S. patent to Bent et al. No. 1,820,265. The pentaerythritol esters of hydrogenated and of polymerized rosin may be made by the same method.

In the case of the mixed pentaerythritol-glycerine esters, it has been found that resins of lower acid number are obtained if the pentaerythritol is first reacted with the resin and the glycerine is used to finish the esterification at the final stage of esterification. This technique is further advantageous in shortening the total reaction time.

The pentaerythritol esters of hydrogenated rosin may be prepared by esterifying hydrogenated rosin or by hydrogenating the esterified rosin, and similarly the pentaerythritol esters of polymerized rosin may be made by polymerizing the esterified rosin or esterifying polymerized rosin.

Where a pentaerythritol ester of hydrogenated rosin is used, it is preferred to employ an ester the rosin nucleus of which has been reduced in unsaturation by at least 50% of the theoretical for the double bonds contained in the abietyl radical, by combination with hydrogen. This means that on an average at least one of the two double bonds in the rosin nucleus has been saturated with hydrogen. I may employ a rosin ester the rosin nucleus of which has been saturated from at least 50% up to 95% or even 100% of the theoretical.

Polymerized rosin is rosin which has been polymerized by chemical treatment in known manner, and is characterized by a molecular weight of from about 5% to about 400% greater than ordinary rosin in its pure state, a melting point as determined by the Hercules Drop Method above 85° C. and in general from about 5° C. to about 100° C. above that of ordinary rosin in its pure state, substantial freedom from hardening substances held in combination, and an iodine value lower than that of the rosin. Rosin and rosin esters may be polymerized by means of mineral acids, metal halides, etc. and the polymerized product, regardless of the method of polymerization, may be further refined in any desired manner as for example by means of selective solvents such as furfural, etc., or by means of selective absorbents, such as fuller's earth, etc. It is preferred to use esters formed by esterifying polymerized rosin having a melting point ranging from about 90° C. to about 176° C., the melting point of the pure dimer of rosin.

The pentaerythritol ester or the resinous material with which the pentaerythritol is esterified or the original rosin or rosin ester before or after hydrogenation or polymerization may be subjected to any suitable known refining processes to reduce color, taste or odor.

In accordance with the present invention, the pentaerythritol esters described above are preferably admixed with a rubbery or rubber-like material such as gum chicle, or substitutes therefor such as crepe rubber, smoked sheet, reclaimed rubber, rubber latex, guayule rubber, gutta-percha, gutta siak, jelutong, balata, factice, or the like. Natural rubber, either in solid form or in the form of latex may desirably be employed as the rubbery or rubber-like constituent of the chewing gum base. Synthetic rubber and latices made thereof may be used. It is preferred to use so-called "synthetic chicle," that is, low grade natural vegetable rubber-like materials too high in resin content (resin content ranging from about 25% and usually from about 40% up to about 90%) to be useful for rubber, such as materials selected from the group consisting of gutta-percha, jelutong, balata, gum tuno, namaqualand rubber (from *Euphorbia drageana*), almeidana or euphorbia gum, abba rubber, and inferior guttas such as gutta siak, gutta cotie, gutta kay, gutta hangkang, gutta jangkar, gutta sundik, gutta soh, gutta susu, gutta penang, yellow gutta, and related materials, and mixtures of the foregoing materials with one another or with gum chicle which is such a low-grade natural rubber-like material. Instead of a single rubbery or rubber-like material, mixtures of two or more thereof may be employed. The pentaerythritol resinous esters are completely miscible with the rubbery or rubber-like materials named. Preferably, the rubbery or rubber-like material is used in an amount such as to yield a weight ratio to the pentaerythritol resinous ester ranging from about 20 to 1 to about 1 to 10 and preferably from about 2 to 1 to about 1 to 2.5. Equal parts by weight of the rubbery or rubber-like material and the pentaerythritol resinous ester form a good chewing gum base.

The chewing gum base may embody other resins, synthetic or natural, such as ordinary rosin, ester gum, cumarone resin, Pontianak resin, copal gum, kauri gum, dammar gum, sweet bay gum, spruce gum, balsams and the like, although it is preferred to keep the percentages of such resins at a minimum to avoid objectionable characteristics which may be imparted to the gum thereby.

There may be incorporated an oily softening agent such as petrolatum, beef stearin, vegetable oil such as cottonseed oil, olive oil, etc.; petroleum oil such as water white mineral oil; hydrogenated vegetable oils such as hydrogenated cottonseed oil which preferably is solid at ordinary temperature, etc. Preferably the oily softening agent is present in minor amount, say not over about 25% by weight based on the weight of the chewing gum base, so as to impart no oily characteristic or flavor to the gum.

In addition, it is frequently desirable to incorporate in the composition a wax or wax-like material such as paraffin wax, ceresin wax, etc. The amount of wax may vary up to about 75% by weight of the base, although usually it will be less than about 35%.

There may be incorporated in the base small amounts of suitable fillers or pigmentary materials such as clay, calcium carbonate, magnesium carbonate, magnesium oxide, barium sulphate, calcium sulphate, carbon black, charcoal, diatomaceous earth, pumice, activated carbon, etc.

The several components are incorporated with one another to form the base in any desired manner as by melting together or by working on a roll mill at temperatures below the melting point of the resinous and rubber-like ingredients, or in any other suitable manner.

The hot chewing gum base may be allowed to cool and the sweetening and flavoring ingredients incorporated subsequently, or they may be added to the base while it is still hot. There may be added the usual mixture of powdered sugar and glucose syrup, or other sweetening agents such as invert sugar, levulose, saccharin, etc. There may be added the usual flavoring ingredients such as oil of peppermint, spearmint, wintergreen, etc., licorice, vanilla, vanillin, etc. and, where gum chicle is not present in the mixture, dry cocoa powder or cocoa syrup.

Below are given several specific examples showing typical methods of preparing a chewing gum base embodying the principles of the present invention. The esters of hydrogenated rosin employed were prepared by the esterification of wood rosin, the unsaturation of which had been reduced by hydrogenation to the extent of approximately 70% of the theoretical, and having an acid number of 168, a color of 5 amber (X on the rosin color scale), a thiocyanate value of about 20, and a melting point (drop) of 79° C. The esters of polymerized rosin used in the examples were prepared by esterifying polymerized wood rosin having the following properties:

| | |
|---|---|
| Acid number | 151–155 |
| Color | 14–26 Amber |
| Grade | X to WG |
| Melting point (drop) | 98–101° C. |

All of the resinous esters employed in the examples had an acid number below 35. The acid number of the mixed esters was below 10. The mixed esters were made by reacting the pentaerythritol with the resin and adding the glycerine at the final period of reaction.

Example 1

| | Percent by weight |
|---|---|
| Hydrogenated cottonseed oil ("Crisco") | 14.3 |
| Stearic acid | 14.3 |
| Crepe rubber | 23.8 |
| Gum chicle | 23.8 |
| Pentaerythritol ester of hydrogenated rosin | 23.8 |

The hydrogenated cottonseed oil and stearic acid were mixed and heated at 135° C. The rubber was added slowly with stirring while the mixture was raised to 165° C. The mixture was maintained at this temperature until the mass was homogeneous. Then the gum chicle was added and the mixture stirred until homogeneous. Thereupon, the pentaerythritol ester was added, the mixture stirred until uniform, and allowed to cool. A light and firm plastic product was obtained which, when incorporated with the usual flavoring and sweetening ingredients made an excellent chewing gum.

Example 2

| | Percent by weight |
|---|---|
| Paraffin (M. P. 125° F.) | 32 |
| Hydrogenated cottonseed oil ("Crisco") | 12 |
| Crepe rubber | 16 |
| Gum chicle | 20 |
| Pentaerythritol ester of K wood rosin | 20 |

The paraffin and hydrogenated cottonseed oil were heated to 140° C., the rubber added, and the mixture stirred until uniform whereupon the gum chicle was added and the mixture again stirred until uniform. The pentaerythritol ester of rosin was then added, the mixture stirred until homogeneous, and then allowed to cool. A good chewing gum base resulted.

Example 3

| | Percent by weight |
|---|---|
| Hydrogenated cottonseed oil ("Crisco") | 22.7 |
| Paraffin (M. P. 125° F.) | 22.7 |
| Crepe rubber | 13.6 |
| Gum chicle | 13.6 |
| Pentaerythritol ester of polymerized rosin | 27.3 |

The hydrogenated cottonseed oil and the paraffin were heated together to 140° C., the rubber added, the mixture stirred, the chicle added, the mixture again stirred, and the pentaerythritol ester of polymerized rosin added and the mixture stirred again until homogeneous. A very satisfactory chewing gum base resulted.

Example 4

| | Percent by weight |
|---|---|
| Hydrogenated cottonseed oil ("Crisco") | 14.3 |
| Stearic acid | 14.3 |
| Crepe rubber | 19.0 |
| Gum chicle | 23.8 |
| Pentaerythritol ester of hydrogenated rosin | 28.6 |

The ingredients were incorporated with one another in precisely the same manner as in Example 1. A tan plastic chewing gum base which was similar to but not quite as rubbery as the product of Example 1 was obtained.

Example 5

| | Percent by weight |
|---|---|
| Paraffin (M. P. 125° F.) | 53.3 |
| Crepe rubber | 13.3 |
| Hydrogenated cottonseed oil ("Crisco") | 13.3 |
| Pentaerythritol ester of hydrogenated rosin | 20.0 |

The paraffin and hydrogenated cottonseed oil were melted together and heated to 135° C. The crepe rubber was then added slowly with stirring while the temperature was raised to 170° C., the mixture being stirred at the temperature until homogeneous. The pentaerythritol ester of hydrogenated rosin was then added, the mixture again stirred until homogeneous, and allowed to cool. A firm but plastic chewing gum base resulted which was not as rubbery as the products obtained in Examples 1 to 4.

Example 6

This example was identical with Example 2 except that in place of the pentaerythritol ester of K wood rosin, there was employed a mixed pentaerythritol-glycerine ester of N wood rosin, in which the polyhydric alcohol portion consisted of 80% by weight of pentaerythritol and 20% by weight of glycerine.

Example 7

This example was identical with Example 1 except that in place of the pentaerythritol ester of hydrogenated rosin, there was employed a mixed pentaerythritol-glycerine ester of hydrogenated rosin in which the polyhydric alcohol comprised 80% pentaerythritol and 20% glycerine.

Example 8

This example was identical with Example 3 except that in place of the pentaerythritol ester of polymerized rosin, there was employed a mixed pentaerythritol glycerine ester of polymerized rosin in which the polyhydric alcohol consisted of 80% pentaerythritol and 20% glycerine.

From the foregoing, it will be seen that the pentaerythritol esters of rosin and modified rosin, and particularly the mixed pentaerythritol-glycerine esters wherein the pentaerythritol is in excess, impart very desirable properties to chewing gum and make possible the more economical and more convenient preparation of chewing gum of the desired physical properties. The physiological inactivity of such esters is a further advantage. Moreover, such esters impart to the chewing gum greater freedom from deterioration and development of objectionable flavor or other deterioration upon the passage of time and result in a somewhat better retention of flavor upon chewing.

The use of polyhydric alcohol esters of hydrogenated rosin in chewing gum is described and claimed in the copending application of J. M. Schantz, Serial No. 340,072, filed June 14, 1940. The use of polymerized rosin and polyhydric alcohol esters of polymerized rosin in chewing gum is disclosed and claimed in the copending application of J. N. Borglin, Serial No. 361,393, filed October 16, 1940.

It will be understood that the details and examples hereinbefore set forth are illustrative only and that the invention as broadly described and claimed is in no way limited thereby.

What I claim and desire to protect by Letters Patent is:

1. Chewing gum material comprising a pentaerythritol ester of a material selected from the group consisting of rosin, hydrogenated rosin and polymerized rosin.
2. Chewing gum material comprising a pentaerythritol ester of rosin.
3. Chewing gum material comprising a pentaerythritol ester of hydrogenated rosin.
4. Chewing gum material comprising a pentaerythritol ester of polymerized rosin.
5. Chewing gum material comprising a mixed pentaerythritol and glycerine ester of a material selected from the group consisting of rosin, hydrogenated rosin and polymerized rosin.
6. Chewing gum material comprising a mixed pentaerythritol and glycerine ester of rosin.
7. Chewing gum material comprising a mixed pentaerythritol and glycerine ester of hydrogenated rosin.
8. Chewing gum material comprising a mixed pentaerythritol and glycerine ester of polymerized rosin.
9. Chewing gum material comprising a mixed pentaerythritol and glycerine ester of a material selected from the group consisting of rosin, hydrogenated rosin, and polymerized rosin, the polyhydric alcohol content of said ester comprising about 80% pentaerythritol and about 20% glycerine, said ester having an acid number not over about 15.
10. Chewing gum material comprising mixed pentaerythritol and glycerine ester of a material selected from the group consisting of rosin, hydrogenated rosin and polymerized rosin, polyhydric alcohol content of said ester comprising a preponderance of pentaerythritol and a minor proportion of glycerine, said ester having an acid number of not more than about 15 and having a melting point of not more than about 150° C.

CLYDE HAMPTON BOYS.